United States Patent
Attassery

(10) Patent No.: US 7,481,862 B2
(45) Date of Patent: Jan. 27, 2009

(54) FILTER ASSEMBLY USING ADHESIVE CENTER TUBE

(75) Inventor: Nishaj Attassery, Fayetteville, NC (US)

(73) Assignee: Purolator Filters NA LLC, Fayetteville, NC (US)

( * ) Notice: Subject to any disclaimer, the term of this patent is extended or adjusted under 35 U.S.C. 154(b) by 415 days.

(21) Appl. No.: 11/148,671

(22) Filed: Jun. 9, 2005

(65) Prior Publication Data

US 2006/0277880 A1    Dec. 14, 2006

(51) Int. Cl.
*B01D 27/00* (2006.01)
(52) U.S. Cl. .............................. 55/502; 55/498; 55/499; 55/449; 55/510; 55/514; 55/521; 55/524; 55/DIG. 5; 210/437; 210/484; 210/493.1
(58) Field of Classification Search ................... 55/449, 55/498, 499, 510, 521, 524, 502, 514, DIG. 5; 210/437, 484, 493.1
See application file for complete search history.

(56) References Cited

U.S. PATENT DOCUMENTS

| | | | | |
|---|---|---|---|---|
| 2,663,660 A | * | 12/1953 | Layte | 156/201 |
| 3,353,457 A | * | 11/1967 | Whittingham et al. | 493/269 |
| 3,692,184 A | * | 9/1972 | Miller et al. | 210/437 |
| 4,151,095 A | * | 4/1979 | Wright | 210/443 |
| 4,735,720 A | * | 4/1988 | Kersting | 210/493.5 |
| 5,071,555 A | * | 12/1991 | Enbom | 210/493.5 |
| 5,207,812 A | * | 5/1993 | Tronto et al. | 55/498 |
| 5,230,455 A | * | 7/1993 | Price | 226/88 |
| 5,350,515 A | * | 9/1994 | Stark et al. | 210/493.2 |
| 7,097,684 B2 | * | 8/2006 | Choi | 55/486 |

OTHER PUBLICATIONS

Figures A-D.

* cited by examiner

*Primary Examiner*—Jason M Greene
*Assistant Examiner*—Minh-Chau T Pham
(74) *Attorney, Agent, or Firm*—Crowell & Moring LLP

(57) ABSTRACT

A cylindrical shaped pleated media includes adhesive beads arranged on a periphery to bridge pleats and provide structural support for the pleated media. The pleated media is used in a fluid filter.

19 Claims, 1 Drawing Sheet

FILTER ASSEMBLY USING ADHESIVE CENTER TUBE

BACKGROUND OF THE INVENTION

This invention relates to a filter assembly having a filter element provided by a pleated media. Structural support for the pleated media is provided by an adhesive.

Filter assemblies such as oil filters typically employ a filter element constructed of a pleated media such as paper. The pleated media is arranged in a cylindrical shape. A steel center tube is typically arranged in a central bore defined by the pleated media to provide structural support to the pleated media so that the pleated media does not collapse under fluid pressure. There has been an effort in the filter industry to eliminate as many steel components as possible.

Pleated media is also used in air filter applications. Typically the pleated media is provided in a flat rectangular shape. A perimeter of the pleated media includes a gasket for sealing against a filter housing. A steel screen is typically used on an outlet side of the pleated media to prevent the media from collapsing under the force generated by an air flow through the pleated media. Adhesive beads have been arranged along the pleated media on an inlet side opposite the steel screen to maintain a desired spacing between pleats. An adhesive such as hot melt glue has been used to provide the beads, which bridge the pleats.

It is desirable to eliminate the steel center tube from the filter assembly in, for example, an oil filter.

SUMMARY OF THE INVENTION

The present invention provides a method of manufacturing a center tube-like structure and a filter assembly that uses adhesive beads to provide structural support to a pleated media. The filter assembly includes a housing providing an inlet and an outlet. A filter element, which may be a paper pleated media, is arranged within the housing to separate the inlet from the outlet. The filter element is arranged in a cylindrical shape. An adhesive is arranged on a side of the filter element to provide structural support that prevents the paper pleated media from collapsing under pressure. In one example, the adhesive, which may be a hot melt glue, is arranged on an outlet side within a central bore provided by the filter element.

The filter element is structurally supported by applying adhesive along the filter element to bridge pleats. Opposing ends of the filter element are arranged near one another when arranging the filter element in a cylindrical shape. The adhesive is fully cured once the filter element has been arranged in the cylindrical shape so that the adhesive is rigid, providing adequate structural support under fluid pressure. Multiple adhesive beads may be used or one or more beads may be laid in a zigzag pattern.

These and other features of the present invention can be best understood from the following specification and drawings, the following of which is a brief description.

DETAILED DESCRIPTION OF THE PREFERRED EMBODIMENT

Figure 1:
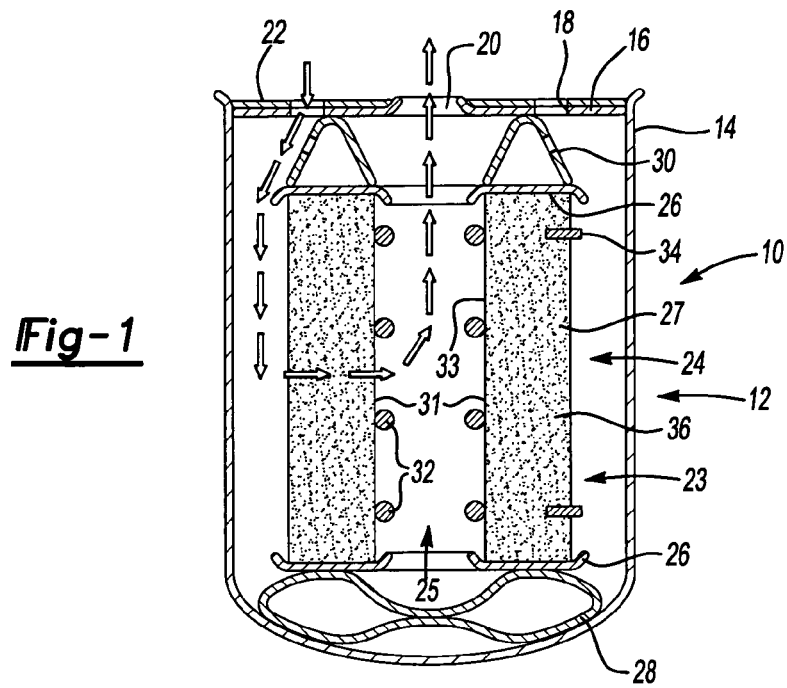
FIG. 1 is a cross-sectional view of a filter assembly using the inventive adhesive beads.

A filter assembly 10, specifically, an oil filter is shown in FIG. 1. The filter assembly 10 includes a housing 12 having a can 14 providing a cavity. A tapping plate 16 is arranged at an open end of the can 14 and is secured by a top plate 22 to the can 14. The tapping plate 16 provides an inlet 18, which is typically provided by multiple holes, and an outlet 20, which is typically provided by a threaded central aperture.

A filter element 24 is mounted between a pair of end caps 26. A guide spring 28 engages one of the end caps 26 and biases the filter element 24 to a desired location within the housing 12. The filter element 24 is arranged between the inlet 18 and outlet 20 so that fluid flowing through the filter assembly 10 must pass through the filter element 24 before exiting the outlet 20. A bypass valve 30 may be arranged between one of end caps 26 and the housing 12. The bypass valve 30 permits the fluid to circumvent the filter element 24 when the filter element 24 becomes clogged.

The filter element 24 is typically provided by a pleated media 27 arranged in a cylindrical shape. The pleated media 27 includes an inlet side 23 at an outer periphery and an outlet side 25 arranged at an inner periphery of the pleated media 27 where the filter element 24 provides a central bore.

Figure 3:
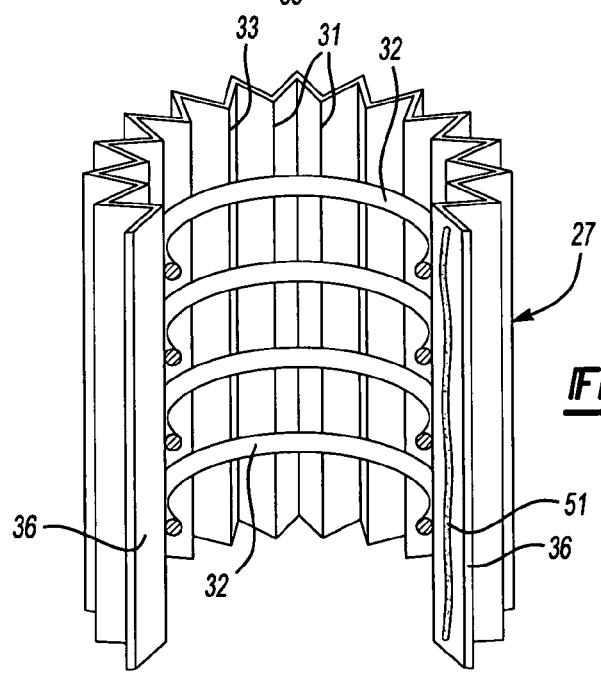
FIG. 3 is a perspective view of the pleated media having the adhesive beads prior to securing the opposing ends to one another.

The pleated media 27 includes an inner periphery 33 providing ridges 31 formed by the pleats of the pleated media 27. Beads of adhesive 32 are arranged at the inner periphery 33 to bridge the ridges 31 as shown in FIG. 3. The adhesive 32 is rigid when fully cured and is sufficient in its cured state to provide desired structural support during normal operation of the filter assembly 10.

Clips 34 may be used to secure opposing ends 36 of the filter media 27 when arranging the filter media 27 into a cylindrical shape. Alternatively, adhesive 51 may be used to secure the opposing ends 36, as shown in FIG. 3.

Figure 2:
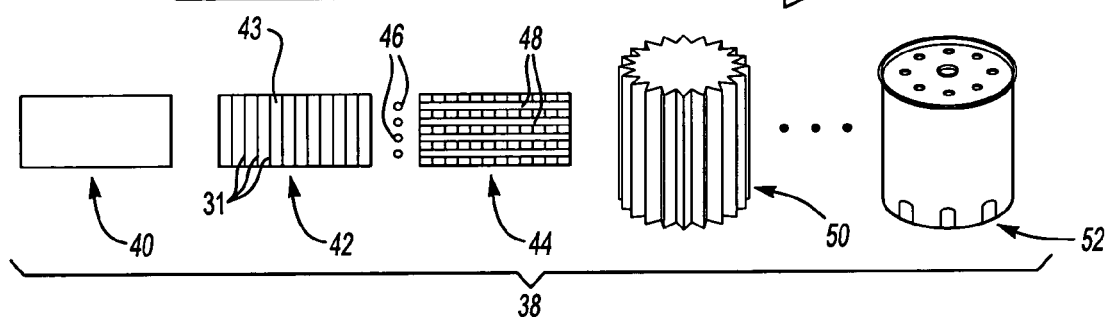
FIG. 2 is a schematic view of an inventive method of providing the adhesive reinforced pleated filter media.

A method of providing the adhesive reinforced filter media 27 is shown generally at 38 in FIG. 2. Typically, a roll of paper filter media 40 is provided. The paper filter media 40 is fed to a pleater 42 to provide pleated media 43 having ridges 31. The pleated media 43 is passed under multiple adhesive dispensers 44 having heads 46 that dispense beads of adhesive 48 across the ridges 31. In one example, a hot melt glue is used as the adhesive 32. It is desirable that the adhesive 32 in its uncured state is sufficiently viscous so as to not flow into the pleated media 43, which would minimize the usable surface area of the pleated media. The pleated media 43 is manipulated to form the pleated media 43 into a cylindrical shaped media 50 prior to the beads of adhesive 48 fully curing.

Referring to FIG. 3, opposing ends 36 are arranged near one another to provide the cylindrical shape. The opposing ends 36 may be joined to one another by clips 34, as shown in FIG. 1, or by applying adhesive 51 to glue the opposing ends 36 to one another.

It may be desirable to arrange the ends of the cylindrical shaped media 50 relative to the opposing end caps 26. Typically the ends of the cylindrical shaped media 50 are embedded in a plastisol or other adhesive dispensed on the end caps 26. The cylindrical shaped media 50, with its beads of adhesive 48, is permitted to cure. In the case of hot melt glue, the beads of adhesive 48 are permitted to cool to cure the glue which provides a rigid bead. The cylindrical shaped media 50 is processed along with other components to provide a filter assembly 52, as shown in FIG. 2.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of manufacturing a filter element comprising the steps of:
   a) providing a filter media;
   b) applying adhesive to a portion of the filter media between opposing end portions, the adhesive not flowing into pleats of the filter media;
   c) arranging the opposing end portions of the filter media in opposing relationship near one another; and
   d) fully curing the adhesive subsequent to performing step c) to provide a rigid support structure for the filter media.

2. The method according to claim 1, wherein step a) includes pleating a material.

3. The method according to claim 1, wherein step b) includes dispensing the adhesive onto the filter media.

4. The method according to claim 1, wherein the adhesive is a hot melt glue.

5. The method according to claim 4, wherein step d) includes the hot melt glue cooling.

6. The method according to claim 1, wherein step c) includes gluing the opposing end portions to one another.

7. The method according to claim 1, wherein step c) includes clipping the opposing end portions to one another.

8. The method according to claim 1, wherein the adhesive is partially cured prior to performing step c).

9. The method according to claim 1, wherein step c) includes providing a ring-like arrangement with the adhesive.

10. A filter media comprising:
    a pleated filter element providing ridges arranged in an arcuate relationship to one another; and
    adhesive bridging the ridges without flowing between the ridges to provide structural support to the ridges for maintaining the arcuate relationship.

11. The filter media according to claim 10, wherein the pleated filter element is arranged to provide a generally cylindrical-shaped filter element, the adhesive arranged in a ring-like shape on the ridges.

12. The filter media according to claim 11, wherein the ridges include an inner periphery providing an outlet side of the pleated filter element.

13. The filter media according to claim 11, wherein the pleated filter element includes opposing end portions arranged in opposing relationship near one another, the adhesive being disposed therebetween.

14. A filter assembly comprising:
    a housing providing an inlet and an outlet;
    a filter element arranged within the housing and separating the inlet from the outlet, the filter element arranged in an arcuate shape; and
    adhesive arranged on a side of the filter element without flowing between ridges of the filter element to provide structural support to maintain the arcuate shape.

15. The filter assembly according to claim 14, wherein the filter element is arranged in a generally cylindrical shape.

16. The filter assembly according to claim 15, wherein the filter element includes an inner periphery providing the side of the filter element.

17. The filter assembly according to claim 16, wherein the side is an outlet side.

18. The filter assembly according to claim 15, wherein the filter element includes a pleated filter media having ridges, the adhesive arranged on the ridges.

19. The filter assembly according to claim 18, wherein the adhesive is a hot melt glue arranged in a ring-like shape on the ridges.

* * * * *